Sept. 14, 1948.　　　E. KOLEHMAINEN ET AL　　　2,449,129
COOKING UTENSIL COMBINATION

Filed Jan. 25, 1946　　　　　　　　　　　　　　　2 Sheets-Sheet 1

INVENTORS.
H. S. BAIRD &
BY E. KOLEHMAINEN

OD Martin
ATTORNEY

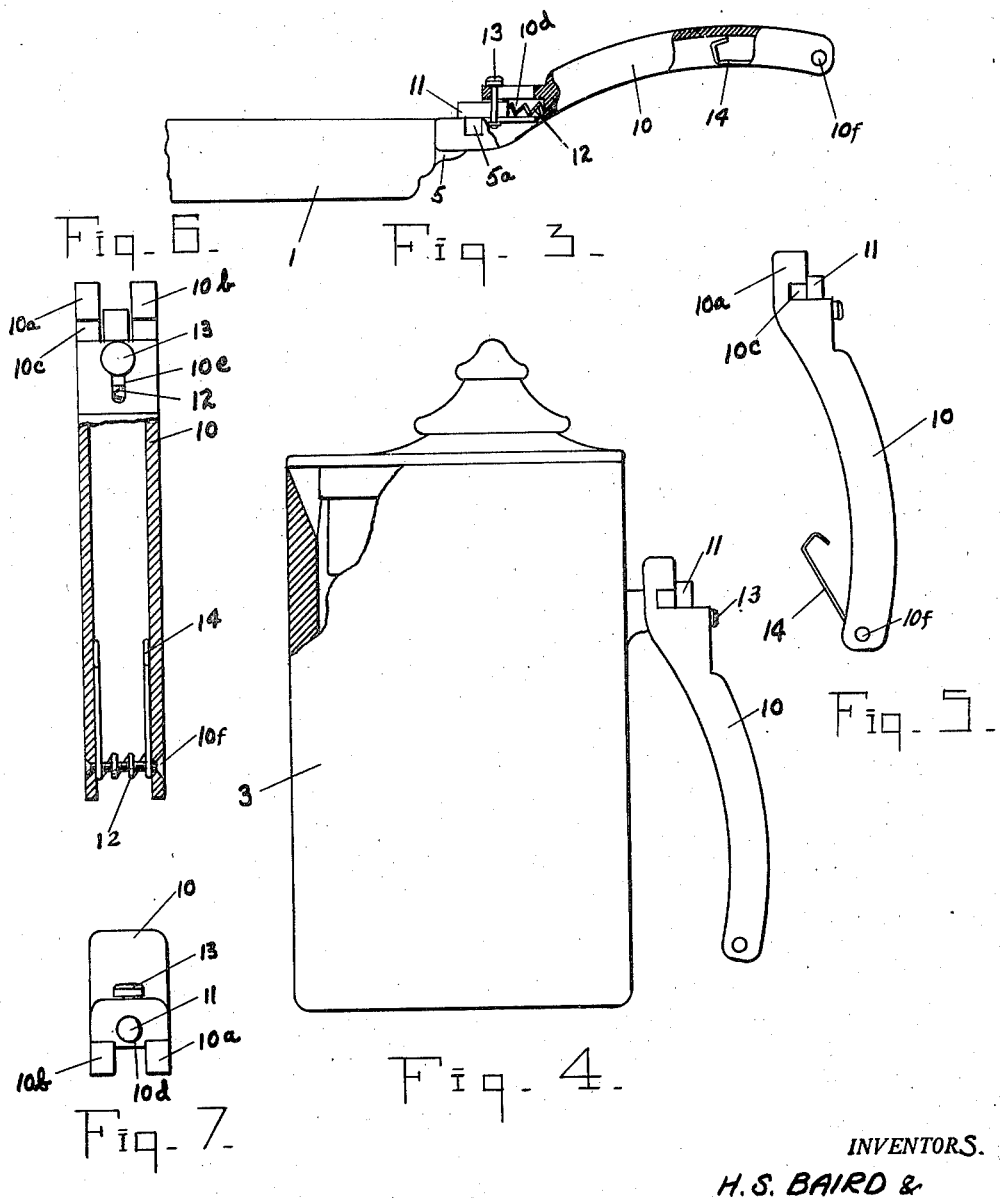

Patented Sept. 14, 1948

2,449,129

UNITED STATES PATENT OFFICE 2,449,129

COOKING UTENSIL COMBINATION

Elmar Kolehmainen and Hugh S. Baird, Inglewood, Calif.

Application January 25, 1946, Serial No. 643,417

9 Claims. (Cl. 206—4)

This invention relates to cooking utensils and has particular reference to improved means for stacking and interlocking such utensils for storing purposes.

In certain cases and under particular circumstances it is most desirable to be able to assemble a required selection of utensils into a very compact pack. This is particularly the case where campers, hunters, or amateur fishermen fit out automobiles or boats for extended trips. Certain utensils are indispensable on such trips and it is essential that the utensils selected are shaped, assembled, and interlocked so firmly that no shaking, rattling, and chafing is possible.

It is the object of the present invention to provide a set of essential cooking utensils so shaped that they can be compactly stacked together.

It is the further object to provide means capable of tightly interlocking the assembled utensils.

Another object is to provide interlocking means which, when not employed for interlocking purposes, are adapted to form handles for interchangeable use on the various utensils.

This and other objects of the invention will be apparent from the following detailed description and by referring to the accompanying drawings, of which:

Fig. 3 is a fragmentary view of one of the utensils and illustrates the construction of the interlocking member of the invention and the method of applying it to the utensil so as to form it into a handle therefor;

Fig. 4 is a side elevational view of another utensil of the combination and with a portion thereof broken away in order to disclose the interior shape thereof; and Figs. 5 to 7 are detail views of a portion of the utensil combination the importance of which will be hereinafter fully described.

Figure 1:
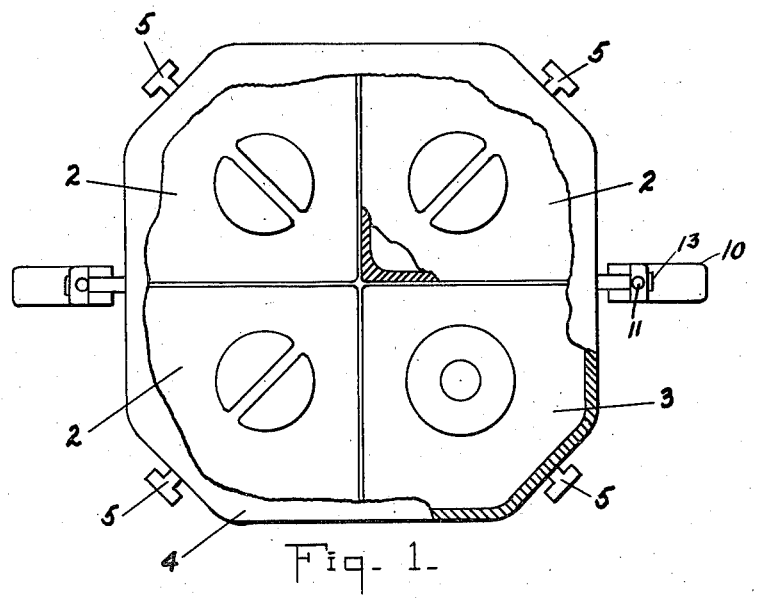
Fig. 1 is a plan view illustrating the combination of the invention and with portions thereof broken away for the sake of clearness.
Figure 2:
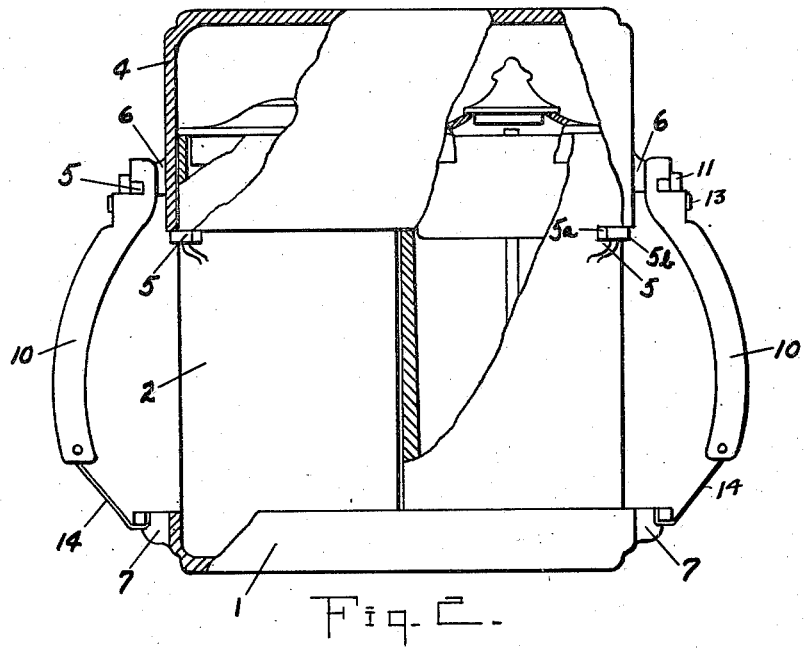
Fig. 2 is a side elevational view of the device, also with some outer portions thereof broken away in order more clearly to illustrate some of the utensils which are partly enclosed.

As illustrated in Figs. 1 and 2 the combined device comprises a vessel such as a frying pan 1, into which are placed four pots which all are identically shaped in horizontal cross section, but three of them may be plain pots 2 and the fourth a coffee pot 3. When these utensils have been placed within the pan, into which they fit sungly, the upper portions of the utensils are held tightly together by inverting a larger pot 4 and placing it over these utensils, as illustrated in Fig. 2.

It is noticed that T-shaped lugs 5 project from the sides of the pots 2 and 3, and it is important to note that the inverted pot 4 comes to rest on these lugs, thereby to maintain this pot in fixed position on the four pots. It is also important to note that the pot 4 is made with similar lugs 6, projecting from opposite sides thereof, and that similar lugs 7 project from opposite sides of the frying pan 1.

As above stated, the members which are used to clamp the utensils together are also adapted to form the handles for the utensils and that these handles are interchangeably employed. This being the case, it is to be understood that the parts of the lugs 5, 6, and 7, which are engaged by these handles when the utensils are separately used, must be identically alike.

Each interlocking member comprises a handle portion 10, the front end of which is bifurcated to form prongs 10$^a$, 10$^b$, having a transverse groove 10$^c$ sunk into the top surface thereof. A cylindrical recess 10$^d$ is sunk into the body of the handle from the end thereof to receive a plunger 11 and a spring 12 is seated behind this plunger to urge it into projected position. A pin 13 is seated in an elongated perforation 10$^e$ of the handle and it extends through the plunger 11 for the purpose of checking projecting movement of the latter.

The rear end of the handle is made U-shaped, substantially as shown, and a transverse pivot 10$^f$ is seated in the end thereof, on which a wire loop 14 is hung. When any one of the utensils is to be used, this wire loop is swung into the position within the handle indicated in Fig. 3, whereupon the plunger 11 is retracted, against the tension of the spring 12. The handle may then be moved under the lug 5 and raised until the sidewise projecting prongs 5$^a$, 5$^b$ come to rest within the transverse groove 10$^c$. The plunger is then released and by the spring projected into the position of Fig. 3 to lock the handle firmly in position on the utensil.

When it is again required to store the utensils away, and after they have been assembled as indicated in Figs. 1 and 2, it is merely required to hook the two handles 10 on to the lugs 6 of the inverted pot 4 in the manner just described, whereupon the wire loops 14 are swung outward, into the position of Fig. 2, and hooked under the prongs of the lugs 7.

It is an important feature of the invention that the four pots 2 and 3 are all identically shaped in cross section, to the end that they may fit tightly together and fit snugly within the pan 1 and pot 4 and be interchangeable with other pots of similar cross-sectional shape.

It is apparent from the foregoing detailed description and by referring to the drawings that we have provided a simple and compact combination of essential cooking utensils for use where storage space is limited.

We claim:

1. A cooking utensil combination comprising, a vessel such as a frying pan, a plurality of pots seatable in said pan and shaped tightly to fit therein, each of said pots having a lug projecting from the side thereof, all of said lugs being positioned at the same elevation above the frying pan, the latter being made with similar lugs, an inverted pot tightly fitted over the tops of said pots and resting on top of the lugs projecting therefrom, said inverted pot having similar projecting lugs for alignment with the lugs of the frying pan, and means engaging the lugs of the inverted pot and the frying pan tightly to clamp the assembled utensils together.

2. A cooking utensil combination comprising a frying pan having lugs projecting from opposite sides thereof, a plurality of pots seated in and tightly fitted within said frying pan, each pot having a similar lug projecting from the side thereof, an inverted pot seatable over the top of said pots and resting on the lugs projecting therefrom, said inverted pot having similar lugs laterally projecting therefrom, and means interconnecting the lugs of the inverted pot with the lugs of the frying pan tightly to clamp the assembled pots together, said means taking the form of handles each of which, when the utensils are separated, may be attached to the lug of any one of the utensils to form an operating handle therefor.

3. In combination, a frying pan, a plurality of pots tightly fitted within said frying pan, an inverted pot tightly fitted over the tops of said pots, a similar lug laterally projecting from each of said utensils, the lugs of said plurality of pots serving as stops for said inverted pot, and a pair of handles attachable to the lugs of said inverted pot and having each a hook-shaped member pivotally mounted thereon for engagement of a lug of the frying pan thereby to clamp the assembled utensils together, each handle being attachable to the lug of any one of the utensils when the latter are separated to form an operating handle therefor.

4. In combination a frying pan, a plurality of pots tightly fitted within said frying pan, an inverted pot tightly fitted over the tops of said pots, a similar lug laterally projecting from each of said utensils, the lugs of said plurality of pots serving as stops for said inverted pot, a pair of handles attachable to the lugs of said inverted pot and having each a hook-shaped member pivotally mounted thereon for engagement of a lug of the frying pan thereby to clamp the assembled utensils together, each handle being attachable to the lug of any one of the utensils when the latter are separated to form an operating handle therefor, and means for locking said handles in position on said lugs.

5. A cooking utensil combination comprising, a vessel such as a frying pan, a plurality of pots all of the same horizontal cross-sectional shape set into said pan and shaped tightly to fit therein, an inverted pot tightly fitted over the tops of the pots and the pan, said frying pan and the said inverted pot having each a pair of identical T-shaped lugs laterally projecting from opposite sides thereof, and means engaging said lugs tightly to clamp said pot and pan together about said plurality of assembled pots, said means including handles each having a groove engaging the T of the lug of one of said utensils and being made with a pivotally hung member attachable to the lug of the other utensil.

6. A cooking utensil combination comprising, a vessel such as a frying pan, a plurality of pots all of the same horizontal cross-sectional shape set into said pan and shaped at the bottom tightly to fit therein, an inverted pot tightly fitted over the tops of the pots in the pan in vertically spaced relation to the pan, all of said utensils being fitted with identically shaped lugs projecting from the sides thereof for vertical alignment when the utensils are assembled as aforesaid, and a plurality of handles shaped to engage vertically aligned lugs of the pan and the inverted pot to tie said parts together about said plurality of pots.

7. A cooking utensil combination comprising a vessel such as a frying pan, a plurality of pots all of the same horizontal cross-sectional shape set into said pan and shaped at the bottom tightly to fit therein, an inverted pot tightly fitted over the tops of the pots in the pan in vertically spaced relation thereto, all of said utensils being fitted with identically shaped lugs projecting from the sides thereof for vertical alignment when the utensils are assembled, as aforesaid, and a plurality of identical devices, each of which is shaped for horizontal attachment to a lug of any one of the utensils when disassembled to form a handle therefor and which is vertically attachable to vertically aligned lugs of the pan and the inverted pot to tie said utensils together about said plurality of pots seated in the pan.

8. A cooking utensil combination comprising a vessel such as a frying pan, a plurality of pots all of the same horizontal cross-sectional shape set into said pan and shaped at the bottom tightly to fit therein, an inverted pot tightly fitted over the tops of the pots in the pan in vertically spaced relation thereto, all of said utensils being fitted with identically shaped lugs projecting from the sides thereof for vertical alignment when the utensils are assembled, as aforesaid, and a plurality of devices, each of which consists of a grip portion shaped at one end thereof for vertical engagement with one of said lugs, the grip portion being at the other end thereof fitted with a resilient element attachable to a vertically aligned lug to clamp said inverted pot and pan in position about said pots in spaced relation to each other.

9. A cooking utensil combination comprising a vessel such as a frying pan, a plurality of pots all of the same horizontal cross-sectional shape set into said pan and shaped at the bottom tightly to fit therein, an inverted pot tightly fitted over the tops of the pots in the pan in vertically spaced relation thereto, all of said utensils being fitted with identically shaped lugs projecting from the sides thereof for vertical alignment when the utensils are assembled, as aforesaid, and a plurality of identical devices, each of which consists of a grip portion shaped at one end thereof for horizontal engagement with one of said lugs to form thereon an operating handle for use when the utensils are disassembled for individual use, and for vertical engagement therewith when the utensils are stacked together, the grip portion being at the other end, fitted with a resilient element attachable to a vertically aligned lug to clamp said inverted pot and the pan in position about the pots in the pan in vertically spaced relation to each other.

ELMAR KOLEHMAINEN.
HUGH S. BAIRD.

REFERENCES CITED

The following references are of record in the file of this patent:

UNITED STATES PATENTS

| Number | Name | Date |
|---|---|---|
| 163,359 | Chambers, Jr., et al. | May 18, 1875 |
| 1,163,211 | Chandler | Dec. 7, 1915 |
| 1,527,349 | Curley | Feb. 24, 1925 |

FOREIGN PATENTS

| Number | Country | Date |
|---|---|---|
| 637,485 | France | Jan. 30, 1928 |